United States Patent
Kloosterboer et al.

(10) Patent No.: US 6,773,638 B2
(45) Date of Patent: Aug. 10, 2004

(54) PROCESS OF MAKING A REPLICA

(75) Inventors: Johan George Kloosterboer, Eindhoven (NL); Fredericus Johannes Touwslager, Eindhoven (NL); Emile Johannes Karel Verstegen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 160 days.

(21) Appl. No.: 09/932,071

(22) Filed: Aug. 17, 2001

(65) Prior Publication Data

US 2002/0033547 A1 Mar. 21, 2002

(30) Foreign Application Priority Data

Jul. 19, 2000 (EP) .............................................. 00202548

(51) Int. Cl.$^7$ .......................... B29C 35/08; B29D 11/00
(52) U.S. Cl. ...................... 264/1.32; 264/1.38; 264/1.7; 264/494; 264/496
(58) Field of Search ............................... 264/1.32, 1.38, 264/1.7, 494, 496

(56) References Cited

U.S. PATENT DOCUMENTS 4,890,905 A    1/1990   Van Rosmalen et al. ... 359/708

FOREIGN PATENT DOCUMENTS

JP             63082735 A  *  4/1988  .................. 264/1.7

* cited by examiner

*Primary Examiner*—Leo B. Tentoni
(74) *Attorney, Agent, or Firm*—Michael E. Belk

(57) ABSTRACT

In a method of manufacturing a replica, a bondable resin composition is provided between a mold and a substrate or a blank, the resin is cured and the replica thus manufactured is removed from the mold. The replica includes the substrate and the reproduction of the mold on the substrate. The curing includes a UV light-initiated cationic polymerization.

5 Claims, No Drawings

PROCESS OF MAKING A REPLICA

The invention relates to a method of manufacturing a replica, which method includes the provision of a bondable resin composition between a mold and a substrate or a blank, carrying out a curing treatment and removing the replica thus manufactured from the mold, which replica comprises the substrate and the reproduction of the mold provided thereon. The invention also relates to a replica obtained by carrying out a UV light-initiated cationic polymerization.

Such a method is known per se from U.S. Pat. No. 4,890,905, filed in the name of the current applicant. The replication process employs a mold or a matrix having an accurately defined surface which is the negative of the desired optical profile of the replica. In the exact determination of the definition of the surface of the mold or matrix, the shrinkage of the synthetic resin of the replica must be taken into account. A small quantity of a liquid, curable synthetic resin composition is provided on the surface of the mold. The substrate, which may or may not be transparent to UV light, is subsequently pressed with the desired side against the mold, or conversely, as a result of which the synthetic resin spreads between the surface of the substrate and the surface of the mold. Said liquid, synthetic resin composition may be provided on the substrate instead of the mold. The synthetic resin mixture is cured and the substrate with the cured synthetic resin layer bonded thereto is removed from the mold. The free surface of the synthetic resin layer is the negative of the corresponding surface of the mold. The advantage of the replication process is that optical components, such as lenses having a complicated refractive surface, for example an aspherical surface, can be manufactured in a comparatively simple manner without subjecting the substrate to complex polishing treatments. A drawback of such a replication by means of polymerization is the occurrence of shrinkage. Particularly if the flow of the bondable resin composition is impeded by gelation or a substantial increase in viscosity, further polymerization will lead to the development of stresses or even to premature delamination. If the product is subsequently removed from the mold, as in the case of, in particular, a replication process, only a partial relaxation of the stresses takes place, particularly if the product formed is composed of a densely bonded polymeric network. Such a bonded polymeric network is desired, however, for the cohesion of the product formed.

Therefore, it is an object of the invention to provide a bondable resin composition which, if it is cured against a mold, exhibits as little relaxation as possible after it has been removed from the mold and hence represents, as accurately as possible, the shape of the mold.

Another object of the invention is to provide a method enabling a replica layer to be provided, either simultaneously or successively, on two sides of the substrate.

Yet another object of the invention is to provide a method of manufacturing a replica, which method employs a bondable resin composition which also features a high reaction rate and a reaction that can be controlled by UV radiation.

A still further object of the invention is to provide a method of manufacturing a replica, which method employs a bondable resin composition, the final product of which corresponds to the currently applicable quality requirements regarding transparency and hardness.

Another object of the invention is to provide a method of manufacturing a replica, wherein a bondable resin composition is employed whose viscosity is so low that it can be accurately dosed in the replica process without any problems.

The method mentioned in the opening paragraph is characterized in accordance with the invention in that the curing treatment is a UV light-initiated cationic polymerization, the resin composition used being a compound comprising at least two cationically polymerizable cyclic ether groups, which only shows signs of gelation when at least 50% of the conversion that can be achieved in the mold under the relevant curing conditions has taken place.

By using such a bondable resin composition, the final product will be free of shrinkage stresses owing to the late gelation and comparatively small shrinkage. According to the applicant, the comparatively small degree of shrinkage can be attributed to the fact that the ring-opening process on which the current curing treatment is based does not cause new bonds, instead the number of bonds in the starting product and in the bonded product more or less correspond to each other, so that only a small degree of shrinkage takes place. Conversely, in the known (meth)acrylate compounds, as known from the above-mentioned U.S. Pat. No. 4,890,905, an increase in the number of new bonds is brought about, which explains the high degree of shrinkage. In addition, in the compounds in accordance with the invention, gelation and vitrification do not occur until a high conversion percentage is reached, so that the development of stresses starts at a much later stage. According to the current applicants, this surprising effect is brought about by a surprisingly large degree of chain transfer, as a result of which, at the beginning of the bonding reaction, predominantly comparatively small molecules are formed which do not form a gel until a high conversion percentage is reached. If the method in accordance with the invention is applied to replicate aspherical lenses of, for example, CD players, the application of the bondable composition in accordance with the invention will cause the shape of the mold to correspond substantially exactly to the product finally formed, as a result of which a much smaller shrinkage correction is necessary. As, in addition, after the product has been removed from the mold, less relaxation is necessary, it is to be expected that the amount of spread in the shape of the replicated lenses will be much smaller in the above-mentioned production process. The method in accordance with the invention can particularly suitably be used to replicate relief structures requiring an accurate (sub-micron) shape reproduction.

Compounds which can suitably be used in the method in accordance with the invention to manufacture a replica include a bondable resin composition of the following general formula:

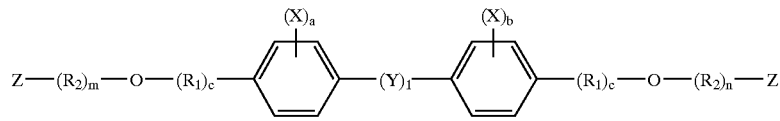

wherein:

Y=—O—, —SO$_2$—, —CH$_2$—, —C(CF$_3$)$_2$—, —C(CH$_3$)$_2$—,

X=a halogen or CH$_3$,

R$_1$=—CH$_2$—, —C(CH$_3$)$_2$—,

R$_2$=—OCH$_2$CH$_2$—, —OCCH$_3$HCH$_2$—, —OCH$_2$CCH$_3$H—, —OCH$_2$CHOHCH$_2$—,

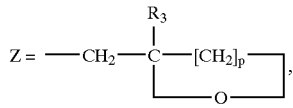

R$_3$=H, C$_n$H$_{2n+1}$, n=an integer$\geq$1, p=1–4, m, a, b, c are each individual integers in the range from 0–4.

For the bondable resin composition use can also suitably be made of a compound selected from the group formed by 1,2,7,8-diepoxyoctane, 3,4-epoxycyclohexylmethyl-3',4'-epoxycyclohexanecarboxylate, bis(3,4-epoxycyclohexylmethyl)adipate, bis(3,4-epoxy-6-methylcyclohexylmethyl) adipate and C$_{12}$–C$_{14}$-alkylglycidylether and the corresponding oxetane compounds thereof. An oxetane compound which can particularly suitably be used is 1,4-bis[(3-ethyl-3-oxetanylmethoxy)methyl]benzene.

Dependent upon the viscosity of the selected bondable resin composition, it may be preferred, in certain embodiments, that the bondable resin composition additionally comprises a reactive diluent, which is preferably selected from the group formed by butylglycidylether, heptylglycidylether, octylglycidylether, allylglycidylether, p-t-butylphenylglycidylether, phenylglycidylether, cresylglycidylether, diglycidylether of 1,4-butanediol, diglycidylether of neopentylglycol, diglycidylether of polypropeneglycol, vinylcyclohexanedioxide, diglycidylether of recorcinol, diglycidylether of polypropenegylcol and diglycidylester of linoleic acid dimer and the corresponding oxetane compounds thereof.

The invention further relates to a replica obtained by carrying out a UV light-initiated cationic polymerization of a compound comprising at least two cationically polymerizable cyclic ether groups, which compound does not exhibit gelation until at least 50% of the conversion that can be achieved in the mold under the relevant curing conditions has taken place, if necessary in the presence of a reactive diluent.

A suitable replica is any relief structure requiring an accurate (sub-micron) reproduction. A further example of a suitable replica is an optical component, in particular an (a)spherical lens, a lens array, a prism, a grating or another relief structure for optical applications, or a combination thereof.

These and other aspects of the invention will be apparent from and elucidated with reference to the embodiment(s) described hereinafter.

COMPARATIVE EXAMPLE

An aspherical lens is manufactured by means of a commonly known photoreplication method by providing a reactive mixture comprising a monomer, a photoinitiator and, if necessary, a sensitizer on the convex side of a planospherical substrate, after which said substrate carrying the reactive mixture is introduced into an aspherical mold and pressed such as to cause the liquid to spread between the substrate surface and the mold surface without the inclusion of air bubbles. Subsequently, the substrate is exposed to UV light passing through said substrate and originating from a high-pressure mercury lamp provided with filters transmitting only the spectral range from 320 to 390 nm. If necessary, the exposure process can be carried out such that the UV light also passes through the mold, provided said mold is embodied so as to be transparent. After the exposure process, the lens is removed from the mold and optically and mechanically examined.

The above-mentioned photoreplication method is carried out using a reactive mixture comprising a solution of 4% 2,2-dimethyoxy-1,2-diphenylethane-1-on in 2,2-bis(4-(2-methacryloxyeth-1-oxy)phenyl)propane. This mixture is exposed at room temperature for 7 seconds at an intensity of 40 mW/cm$^2$ and subsequently removed, whereafter it is re-exposed at 10 mW/cm$^2$ for 1 hour at room temperature and stabilized in the dark for 16 hours at 140° C. The lens thus obtained is optically and mechanically characterized.

During the polymerization process, the mixture exhibited approximately 7% shrinkage. Using such a reactive mixture, the aspherical mold must be corrected in an iterative process in order to obtain a lens of the desired shape.

EXAMPLE IN ACCORDANCE WITH THE INVENTION

The commonly known photoreplication method described in the comparative example hereinabove is used, except that the reactive mixture used is a solution of 4.75% diphenyliodoniumhexafluoroarsenate and 0.25% anthracene in 2,2-bis(4-(glycidyloxy)phenyl)propane. This mixture is subsequently exposed at room temperature for 7 seconds at an intensity of 100 mW/cm$^2$ and subsequently removed, whereafter it is re-exposed at 10 mW/cm$^2$ for 1 hour at room temperature, and stabilized in the dark at 120° C. for 16 hours. The lens thus obtained is optically and mechanically characterized.

During the polymerization process, the mixture exhibited approximately 2.3% shrinkage. Using such a reactive mixture comprising a compound including at least two cationically polymerizable cyclic ether groups, it is not, or hardly, necessary, unlike the reactive mixture used in the comparative example, to correct the aspherical mold in order to obtain a lens of the desired shape. This favorable result is attributed to the fact that after removal from the mold, hardly any relaxation occurs. This very small degree of relaxation, as compared to the reactive mixture used in the comparative example, can be attributed, according to the current applicants, to a combination of reduced shrinkage and retarded gelation.

What is claimed is:

1. A method of manufacturing a replica, which method comprises the provision of a bondable resin composition between a mold and a substrate or a blank, carrying out a curing treatment and removing the replica thus manufactured from the mold, which replica includes the substrate and the reproduction of the mold provided thereon, the curing treatment is a UV light-initiated cationic polymerization, the resin composition used being a compound with at least two cationically polyruerizable cyclic ether groups, which only shows signs of gelation when at least 50% of the conversion that can be achieved in the mold under the relevant curing conditions has taken place.

2. The method of claim 1, wherein the resin composition further comprises a reactive diluent.

3. The method of claim 1, wherein the compound is represented by the following general formula:

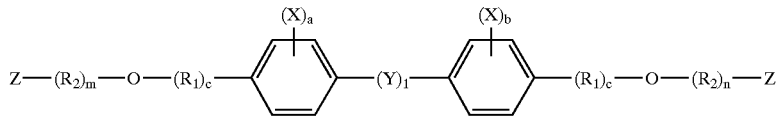

wherein:

Y= —O—, —SO$_2$—, —CH$_2$—, —C(CF$_3$)$_2$—, —C(CH$_3$)$_2$—,

X=a halogen or CH$_3$,

R$_1$= —CH$_2$—, —C(CH$_3$)$_2$—,

R$_2$= —OCH$_2$CH$_2$—, —OCCH$_3$HCH$_2$—, —OCH$_2$CCH$_3$H—, —OCH$_2$CHOHCH$_2$—,

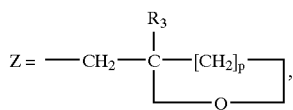

R$_3$=H, C$_n$H$_{2n+1}$, n=an integer<1, p=1–4, m, a, b, c are each individual integers in the range from 0–4.

4. The method of claim 1, wherein the compound is selected from one or more of the group comprising: 1,2,7,8-diepoxyoctane, 3,4-epoxycyclohexylmethyl-3',4'-epoxycyclohexanecarboxylate, bis(3,4-epoxycyclohexylmethyl)adapate, bis(3,4-epoxy-6-methylcyclohexylmethyl)adipate and C12-C14-alkylglycidylether and the corresponding oxetane compounds thereof, in particular 1,4-bis[(3-ethyl-3-oxetanylmethoxy)diethyl]benzene.

5. The method of claim 2, wherein the reactive diluent is selected from one or more of the group comprising: butylglycidylether, heptylglycidylether, octylglycidylether, allylglycidylether, p-t-butylphenylglycidylether, phenylglycidylether, cresylglycidylether, diglycidylether of 1,4-butanediol, diglycidylether of neopentylglycol, diglycidylether of polypropeneglycol, vinylcyclohexanedioxide, diglycidylether of recorcinol, diglycidylether of polypropeneglycol and diglycidylester of linoleic acid dimer and the corresponding oxetane compounds thereof.

* * * * *